No. 620,612. Patented Mar. 7, 1899.
H. M. REYNOLDS.
DRILL CHUCK.
(Application filed Apr. 25, 1898.)
(No Model.)
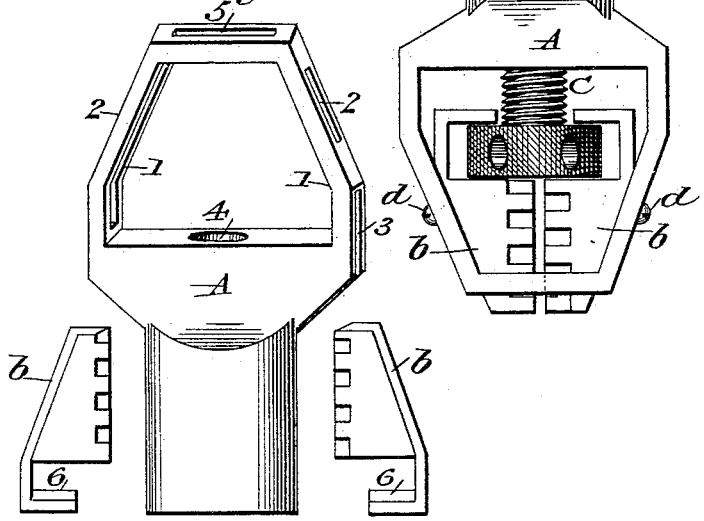
Witnesses
August Schubert
M. H. Colway
Inventor.
Herman M. Reynolds
THE NORRIS PETERS CO., PHOTO-LITHO., WASHINGTON, D. C.

UNITED STATES PATENT OFFICE.

HERMAN M. REYNOLDS, OF ONEIDA, NEW YORK.

DRILL-CHUCK.

SPECIFICATION forming part of Letters Patent No. 620,612, dated March 7, 1899.

Application filed April 25, 1898. Serial No. 678,816. (No model.)

*To all whom it may concern:*

Be it known that I, HERMAN M. REYNOLDS, a resident of Oneida, in the county of Madison and State of New York, have invented certain new and useful Improvements in Drill-Chucks; and I do hereby declare the following to be a full, clear, and exact description of the invention, such as will enable others skilled in the art to which it appertains to make and use the same.

My invention relates to an improvement in drill-chucks, the objects of the invention being to so construct a drill-chuck that all parts will be open and exposed and easy of access, to lighten the weight and balance the chuck for rapid work, and to produce a powerful grip without affecting the rigidity and detracting in the slightest degree from the accuracy, but adding to the simplicity and durability of same.

A further object is to provide a drill-chuck that can be cleaned without taking apart and be equally effective in holding a drill for heavy, light, or swift work.

With these objects in view the invention consists in certain novel features of arrangement of parts, as hereinafter set forth, and pointed out in the claim.

In the accompanying drawings, Figure 1 is an elevation of the drill-chuck embodying my improvements with all parts in place. Fig. 2 shows the chuck taken apart, each part being represented by letters or numerals.

Referring to letters and numbers upon the drawings, A is the flat skeleton body with round shank and two bevel sides having opening through center to admit jaws $b$ $b$; 1 1, grooves inside of body A that jaws $b$ $b$ slide in; 2 2, slots in side of body A, through which the screws or lugs $d$ $d$ pass and connect to jaws $b$ $b$ to hold them in place, causing them to follow the bevel of body A; 3 3, opening in body A to prevent dirt from lodging back of jaws; 4, hole tapped in shank of body A, in which screw C runs when forcing the jaws $b$ $b$ open and shut; 5, opening through which jaws $b$ $b$ project when closed; $b$ $b$, jaws beveled on one side the same angle as sides of body A that slide inside of groove 1 1 and have interlocking teeth fitting together and cut at angles, forming a V-groove, in center in which drill is held; 6 6, slots in upper ends of jaws, forming hooks that fit over head of screw; C, screw with large flat head, with wrench-holes and rough on outer edge, that fits in hook on end of jaws and screws in shank of body above jaws to open jaws by pulling on hook and sliding jaws up bevel side of body A, causing them to open, and pressing against ends of jaws when turning out to close them by forcing them down bevel sides of body, producing a wedging grip upon drill in combination with the jack-screw pressure against the upper ends.

Having thus described my invention, what I claim, and desire to secure by Letters Patent, is—

In a drill-chuck, in combination, a skeleton body having oppositely-beveled, slotted sides, correspondingly-beveled jaws secured by screws in the slotted sides and having lugs to engage a driving-screw, and an axially-located driving-screw for operating said jaws; substantially as described and shown.

In testimony whereof I have signed this specification in the presence of two subscribing witnesses.

H. M. REYNOLDS.

Witnesses:
M. H. COLWAY,
J. F. KNOWLES.